(12) United States Patent
Raith

(10) Patent No.: US 7,209,753 B2
(45) Date of Patent: *Apr. 24, 2007

(54) METHOD TO CONTROL THE UPDATE FREQUENCY OF A POSITIONING DEVICE BY A MOBILE TERMINAL

(75) Inventor: Alex Krister Raith, San Diego, CA (US)

(73) Assignee: Ericsson Inc., Research Triangle Park, NC (US)

( * ) Notice: Subject to any disclaimer, the term of this patent is extended or adjusted under 35 U.S.C. 154(b) by 186 days.

This patent is subject to a terminal disclaimer.

(21) Appl. No.: 11/004,211

(22) Filed: Dec. 3, 2004

(65) Prior Publication Data

US 2005/0101333 A1   May 12, 2005

Related U.S. Application Data

(63) Continuation of application No. 09/656,894, filed on Sep. 7, 2000, now Pat. No. 6,856,807.

(51) Int. Cl.
*H04Q 7/20* (2006.01)

(52) U.S. Cl. ............... 455/456.1; 455/434; 455/515

(58) Field of Classification Search ............ 455/456.1, 455/434, 343, 574, 515, 41.2, 552.1; 342/357.01, 342/357.06, 357.08, 357.1, 357.12, 104, 342/107, 109, 457
See application file for complete search history.

(56) References Cited

U.S. PATENT DOCUMENTS

| | | | |
|---|---|---|---|
| 4,912,645 A | 3/1990 | Shoji et al. | |
| 4,968,981 A | 11/1990 | Sekine et al. | 342/356 |
| 5,442,680 A | 8/1995 | Schellinger et al. | |
| 5,448,751 A | 9/1995 | Takenaka et al. | |
| 5,477,215 A | 12/1995 | Mandelbaum | |
| 5,537,474 A | 7/1996 | Brown et al. | |
| 5,570,467 A | 10/1996 | Sawyer | 455/33.1 |
| 5,598,166 A | 1/1997 | Ishikawa et al. | |
| 5,613,204 A | 3/1997 | Haberman et al. | |
| 5,670,950 A | 9/1997 | Otsuka | |
| 5,786,789 A * | 7/1998 | Janky | 342/357 |
| 5,794,141 A | 8/1998 | Zicker | |
| 5,805,067 A | 9/1998 | Bradley et al. | |
| 5,870,674 A | 2/1999 | English | |
| 5,875,395 A | 2/1999 | Holmes | |
| 5,911,120 A | 6/1999 | Jarett et al. | |
| 5,926,760 A | 7/1999 | Khan et al. | |
| 5,956,626 A | 9/1999 | Kaschke et al. | |
| 5,960,085 A | 9/1999 | de la Huerga | |
| 5,995,839 A | 11/1999 | Coursey et al. | |

(Continued)

FOREIGN PATENT DOCUMENTS

DE   3140415 A1   4/1983

(Continued)

*Primary Examiner*—Lee Nguyen
(74) *Attorney, Agent, or Firm*—Coats & Bennett, P.L.L.C.

(57) ABSTRACT

A mobile radiocommunications terminal contains or is operatively connected to a position estimator, such as a GPS receiver. The mobile terminal stores at least one reference position. The mobile terminal updates its position at a frequency that is a function of its distance from the reference position, or as a function of the rate of change of its distance from the reference position.

17 Claims, 4 Drawing Sheets

U.S. PATENT DOCUMENTS

| | | |
|---|---|---|
| 6,011,960 A | 1/2000 | Yamada et al. |
| 6,011,973 A | 1/2000 | Valentine et al. |
| 6,044,268 A | 3/2000 | Haartsen |
| 6,058,108 A | 5/2000 | Raith et al. ............ 370/337 |
| 6,085,090 A * | 7/2000 | Yee et al. ............ 455/440 |
| 6,141,560 A | 10/2000 | Gillig et al. |
| 6,167,285 A | 12/2000 | Howe |
| 6,219,539 B1 | 4/2001 | Basu et al. |
| 6,236,859 B1 | 5/2001 | Morper |
| 6,285,881 B1 | 9/2001 | Huang |
| 6,362,783 B1 * | 3/2002 | Sugiura et al. ............ 342/457 |
| 6,370,381 B1 * | 4/2002 | Minnick et al. ............ 455/445 |
| 2003/0036389 A1 * | 2/2003 | Yen ............ 455/456 |

FOREIGN PATENT DOCUMENTS

| | | |
|---|---|---|
| EP | 0528530 | 2/1993 |
| EP | 0700227 A2 | 3/1996 |
| EP | 0880296 A1 | 11/1998 |
| WO | WO 90/04293 | 4/1990 |

* cited by examiner

METHOD TO CONTROL THE UPDATE FREQUENCY OF A POSITIONING DEVICE BY A MOBILE TERMINAL

This is a continuation of application Ser. No. 09/656,894 filed Sep. 7, 2000 now U.S. Pat. No. 6,856,807.

BACKGROUND OF THE INVENTION

The present invention generally relates to position estimating devices and, more particularly, to a method of controlling the update frequency of a position estimating device in a mobile terminal.

The wireless communication industry has made phenomenal strides in commercial operations in the United States and the rest of the world. Growth in major metropolitan areas has far exceeded expectations. If this trend continues, it is possible that wireless communications will provide the bulk of telecommunication services in some areas. As a result of this growth, wireless communication services have become more affordable. In light of the recent trend of competitive air-time rates, customers may choose to make wireless communication devices their primary means of personal communication. The popularity of wireless communication devices is further enhanced by their ability to be used for non-voice communication, such as facsimile and data transmission.

In the near future, wireless communication devices will incorporate position estimating devices to enhance the function and utility of the wireless communication device. Perhaps the best known use of position estimating technology is for navigation. Another common use for position estimating devices is to identify facilities, such as hotels or restaurants, that are nearby the current position of the wireless communication device. Position information can also be used to enhance intrinsic functions of wireless communication devices. For example, position information can be used to improve cell reselection or hand-off decisions in mobile terminals. Examples of how position information may be used to enhance intrinsic functions of the mobile terminal are illustrated in the following U.S. patent applications: Ser. No. 09/498,785 entitled "Position Assisted Handoff in a Wireless Communication Network"; Ser. No. 09/505,431 entitled "Position Assisted Service Selection"; and Ser. No. 09/498,772 entitled "System and Method For Improving Channel Monitoring In a Cellular System."

Position estimating devices have a broad variety of uses and can significantly enhance the utility and, therefore, the desirability of wireless communication devices

BRIEF SUMMARY OF THE INVENTION

The present invention is a mobile terminal having a GPS receiver or other position estimating device and control logic. The control logic periodically executes a routine to update the current location of the mobile terminal. The position update frequency, i.e., the frequency at which position updates are performed, is varied depending upon the distance between the mobile terminal and a point of interest to reduce the power consumed by the position estimating device. A reference position for the point of interest is stored in the mobile terminal for comparison with the current position of the mobile terminal. In one embodiment, the position update frequency is adjusted so that position updates are less frequent when the mobile terminal is far away from the point of interest and more frequent when the mobile terminal is close to the point of interest. The frequency of position updates may also be dependent on the velocity of the mobile terminal. That is, the update frequency is made less frequent when the mobile terminal is stationary or moving slowly.

DETAILED DESCRIPTION OF THE INVENTION

Figure 1:
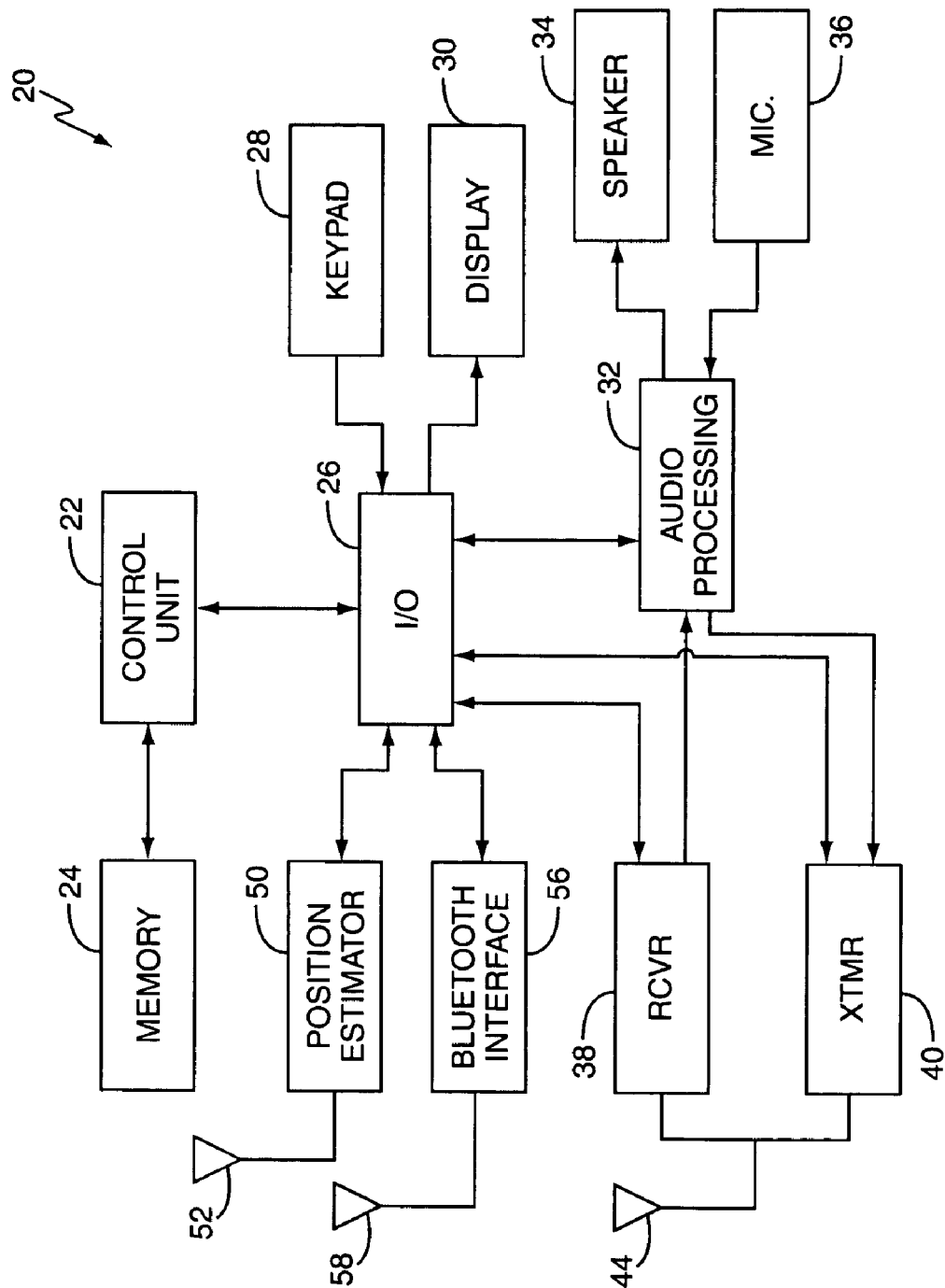
FIG. 1 is a block diagram illustrating the functional elements of an exemplary mobile terminal.

Referring now to the drawings, FIG. 1 is a block diagram of a mobile terminal indicated generally by the numeral 20. The term "mobile terminal" as used herein may comprise a cellular radiotelephone; a Personal Communications Service (PCS) terminal that may combine a cellular radiotelephone with data processing, facsimile and data communications capabilities; a Personal Digital Assistant (PDA) that may include a radiotelephone, pager, Internet/intranet access, Web browser, organizer, and/or calendar; a conventional laptop computer, a palmtop computer, or other appliance that includes a radiotelephone transceiver. Mobile terminals may also be referred to as "pervasive computing" devices.

Mobile terminal 20 may employ a wide variety of communication standards and protocols, which are published by organizations such as the Telecommunications Industry Association/Electronics Industry Association (TIA/EIA) and the European Telecommunication Standards Institute (ETSI), including without limitation Time Division Multiple Access (TDMA) standards such as TIA/EIA-136 and the Global System for Mobile Communications (GSM), Code Division Multiple Access (CDMA) standards such as TIA/EIA-95, Wideband Code Division Multiple Access (WCDMA) standards such as cdma2000, Universal Wireless Communications (UWC) 136, and satellite communication standards such as Globestar. The details of the communication protocols used by the mobile terminal 20 are not material to the invention.

Mobile terminal 20 comprises a main control unit 22 for controlling the operation of the mobile terminal 20 and memory 24 for storing control programs and data used by the mobile terminal 20 during operation. Input/output circuits 26 interface the control unit 22 with a keypad 28, display 30, audio processing circuits 32, receiver 38, transmitter 40, and positioning receiver 50. The keypad 28 allows the operator to dial numbers, enter commands, and select options. The display 30 allows the operator to see dialed digits, stored information, and call status information. The audio processing circuits 32 provide basic analog audio outputs to a speaker 34 and accept analog audio inputs from a microphone 36. The receiver 38 and transmitter 40 receive and transmit signals using shared antenna 44.

Local terminal 20 may also include an alternative interface 56, such as a "Bluetooth" air interface, which may use a separate antenna 58. Bluetooth is a universal radio interface in the 2.45 GHz frequency band that enables portable electronic devices to connect and communicate wirelessly via shortrange, adhoc networks. Persons interested in various details regarding the Bluetooth technology are referred to the article entitled "Bluetooth-the universal radio interface for ad hoc, wireless connectivity" authored by Jaap Haartsen, which can be found in the Ericsson review, Telecommunications Technology Journal, No. 3, 1998, the disclosure of which is incorporated herein by reference. For the purposes of the present invention, only Bluetooth features of immediate interest are described herein.

In Bluetooth systems, a fixed station may act as a master device and continuously transmit INQUIRE messages for receipt by any mobile terminals 20 that may be in the vicinity of the fixed station. A mobile terminal 20 in the vicinity of the fixed station would recognize the presence of the fixed station. The mobile terminal 20 could then initiate communications with the fixed station over the Bluetooth interface. The fixed station may be part of an alternate communication network as will be hereinafter described in greater detail. Additionally, the mobile terminal 20 includes a position estimator 50 electrically and operatively coupled to a navigation signal antenna 52. Position estimator 50 functions to determine the geographical position or location of the mobile terminal 20 at selected times. Position estimator 50 generates geographic position estimates under the control of the control unit 22 using navigation signals received through navigation signal antenna 52. These navigation signals may be broadcast by navigation satellites, e.g. those of the Global Positioning System (GPS). GPS signal reception and position determination therefrom are well known in the art. Such position determination is disclosed in U.S. Pat. No. 4,968,981 to Sekine, et al., entitled "GPS Receiver Apparatus," the disclosure of which is incorporated herein in its entirety. Other position determining technologies are also available, for example the Russian equivalent to the US operated GPS system. There are also terrestrial based position and navigation systems (e.g. LORAN), which could be used in the practice of the present invention.

Navigation signal antenna 52 receives navigation signals, e.g., from navigation satellites, for the calculation of position estimates. The size and location of navigation signal antenna 52 is illustrative only, and may in practice be pivotably or retractably mounted, may be detachable, or may be designed into the housing of mobile terminal 20.

With a position estimator 50, mobile terminal 20 gains expanded functionality and flexibility in its operations. In particular, the mobile terminal 20 can use position estimates for a wide variety of purposes, such as to improve channel reselection and hand-off decisions, or to access a database of location specific information depending on the current location of the mobile terminal. For example, pending U.S. Pat. No. 6,711,408 entitled "Position Assisted Handoff Within a Wireless Communication Network" discloses a method for making hand-off decisions based on the current location of the mobile terminal 20. U.S. patent application Ser. No. 09/505,301 entitled "Position Assisted Service Selection" discloses a method for choosing a service provider based on the current position of the mobile terminal 20. U.S. Pat. No. 6,625,457 entitled "Mobile Terminal With Location Database" discloses a mobile terminal 20 that uses the current position of the mobile terminal 20 to retrieve location specific information, such as the nearest hotel, from a database in the mobile terminal 20. U.S. patent application Ser. No. 09/498,772 entitled "System and Method For Improving Channel Monitoring In a Cellular System" discloses a method for monitoring channels on a neighbor list. U.S. Pat. No. 6,493,550 entitled "System Proximity Detection By Mobile Stations" discloses a method for acquiring service with a private radio communication system based on proximity to the private system. These applications are incorporated herein by reference.

The present invention is not concerned specifically with how position information is used by the mobile terminal 20 and the above cited examples therefore should not be construed as limiting the invention in any way. It is simply assumed for purposes of describing the present invention that position information is used in some manner by the mobile terminal 20 for some useful but unspecified purpose. The present invention relates specifically to the manner in which the current position of the mobile terminal 20 is updated. In particular, the present invention relates to a method for controlling the position update frequency of the position estimator 50 based on the distance of the mobile terminal 20 relative to a specific point of interest.

Figure 2:
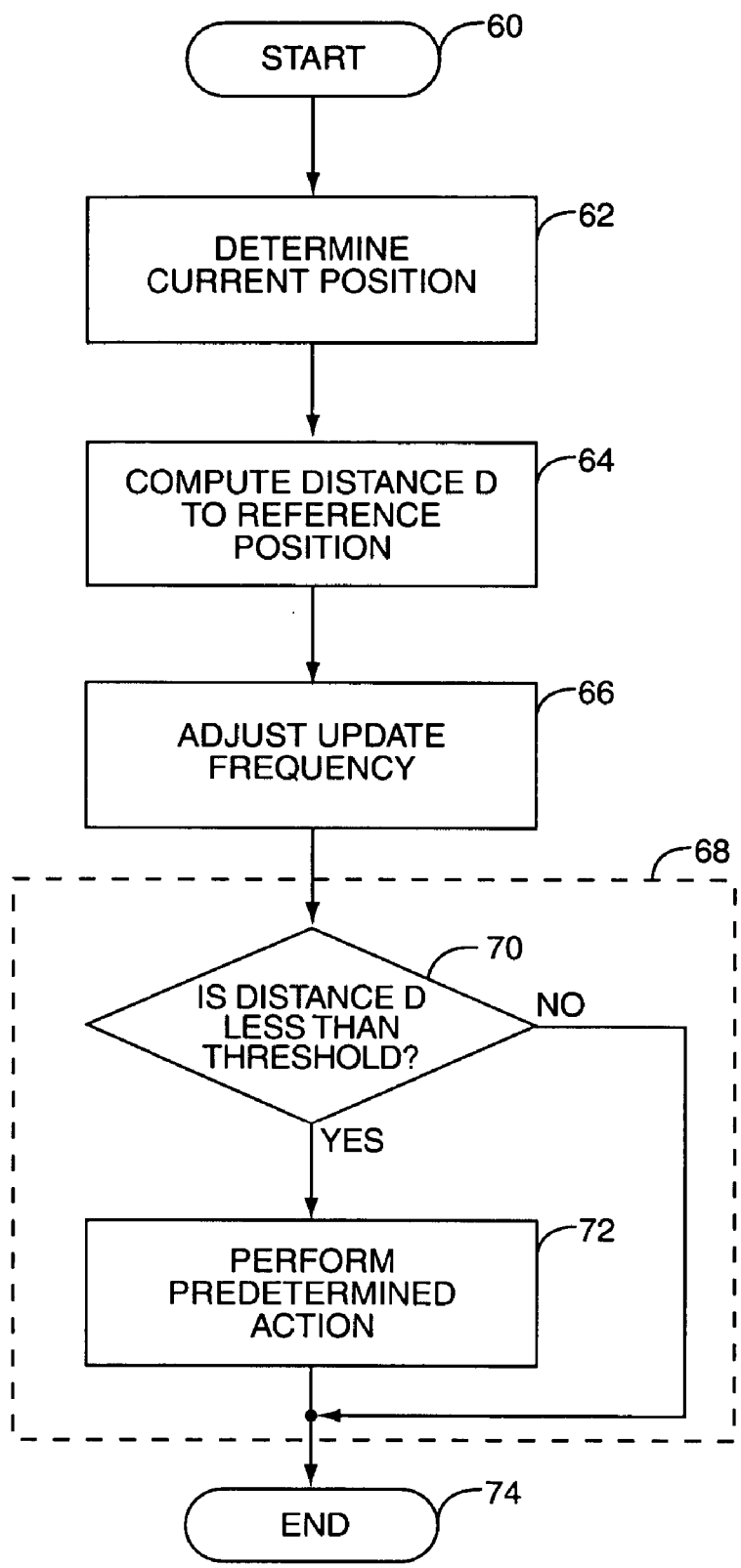
FIG. 2 is a flow chart illustrating an exemplary position update procedure according to the present invention.

FIG. 2 is a flow diagram illustrating an exemplary method for determining the position update frequency of the mobile terminal 20. At block 60, a triggering event causes the control unit 22 to initiate the position update routine. The triggering event may, for example, be the expiration of a timer used by control unit 22 that determines the position update frequency of the mobile terminal 20. This timer (not shown) may be initially set to a predetermined default value and updated as hereinafter described. Upon expiration of the timer or upon the occurrence of some other triggering event, the mobile terminal 20 determines its current position (block 62) and thereafter computes the distance D of the current position to a reference position corresponding to a point of interest (block 64). Additionally, the mobile terminal 20 may compute the speed or velocity of the mobile terminal 20 based on two or more position estimates over a period of time. In block 66, the mobile terminal 20 adjusts the position update frequency as needed based on the computed distance D, velocity V, or a combination of the distance D and velocity V. At block 68, the mobile terminal can optionally perform additional acts or steps. For example, current position of the mobile terminal 20 may optionally be returned to a calling procedure or application that has requested the current position of the mobile terminal 20. Additionally, the mobile terminal 20 may take action based on the distance D between the current position of the mobile terminal and the reference position. In this case, the mobile terminal 20 may compare the distance D to a threshold distance at block 70. If the distance D is less than the distance threshold, the mobile terminal 20 may perform a predetermined action (step 72). For example, the predetermined action may comprise acquiring service with an alternate network when the distance D is within a predetermined radius of a reference position of the alternate network, as will be described in greater detail below. After the additional steps represented by block 68 are performed, the position update procedure terminates (block 74).

The algorithm for adjusting the position update frequency of the mobile terminal 20 at block 66 may be as simple or as complex as needed or desired in a particular application. In one embodiment of the invention, the position update procedure employs a sliding scale so that position updating becomes more frequent as the mobile terminal 20 moves closer to the point of interest and becomes less frequent as the mobile terminal 20 moves farther from the point of interest. A sliding scale can be implemented, for example, by comparing the computed distance D of the mobile terminal 20 from the point of interest to one or more predetermined set points and adjusting the update frequency accordingly. By reducing update frequency as the mobile terminal 20 moves away from the point of interest, the power drain on the battery can be significantly reduced.

Figure 3:
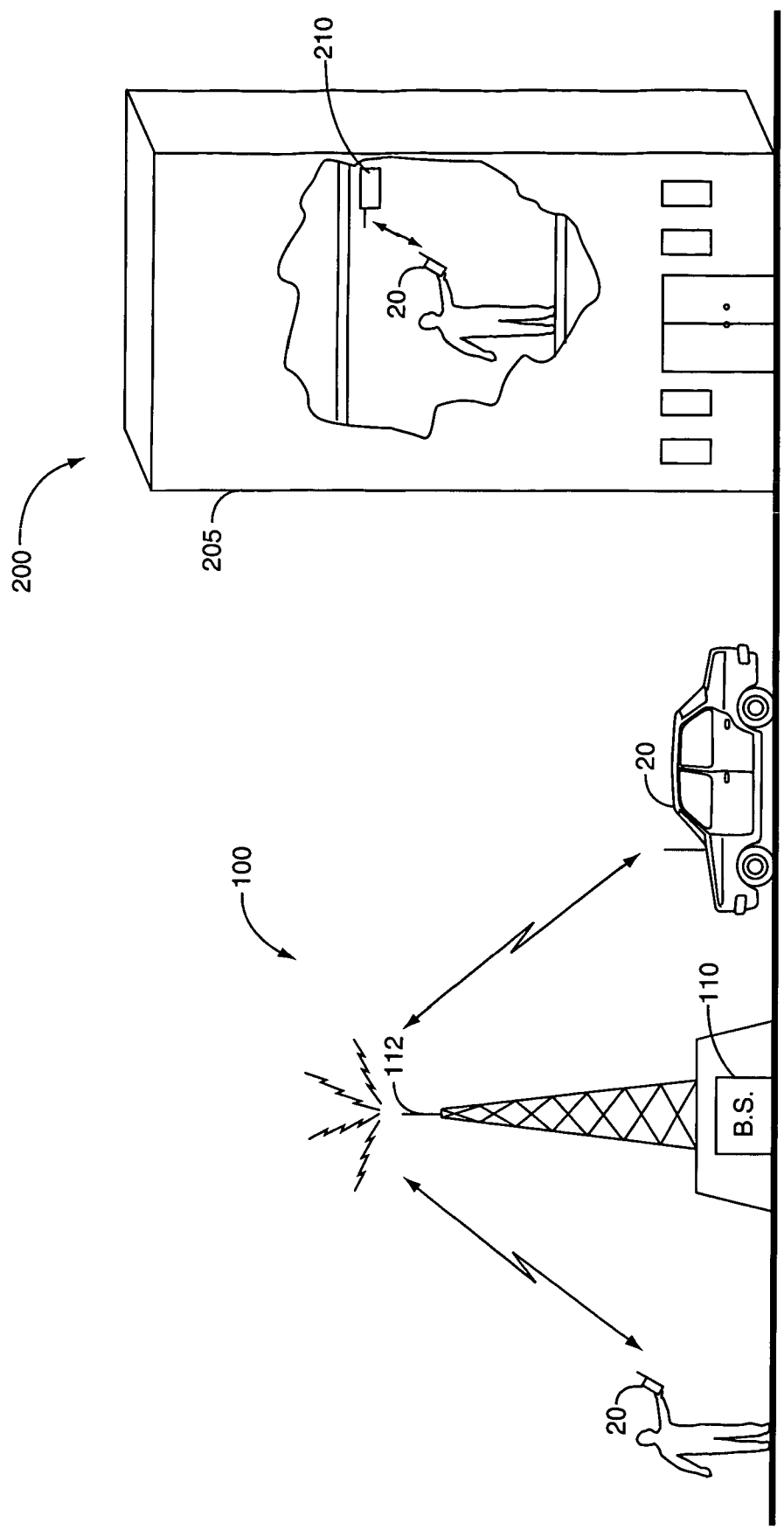
FIG. 3 is a schematic representation of a public and private radiocommunication system.

FIG. 3 illustrates one possible application where the control of the position update frequency of a positioning device can be useful. FIG. 3 shows a mobile terminal 20 in a vehicle traveling within the coverage area of a public land mobile network 100. Public land mobile network (PLMN) 100 comprises a base station 110 coupled to an antenna 112. Base station 110 provides radiocommunication services to various mobile terminals 20 within its area of coverage, or cell. Base station 110 is connected to a mobile switching circuit (not shown), which in turn is connected to the public switched telephone network (not shown).

Proximate to PLMN 100, and possibly within or partially within the coverage area of PLMN 100, is a private wireless telephone system (PWTS) 200. PWTS 200 is one example of an alternate network. PWTS 200 provides radiocommunication services within a facility 205. In the exemplary embodiment described herein, the PWTS 200 is structurally and functionally similar to PLMN 100. PWTS 200 comprises a plurality of base stations 210 located strategically throughout facility 205 to provide continuous coverage to mobile terminals 20 therein. Base stations 210 may be interconnected with a MSC (not shown) in the PLMN 100 or may be interconnected to the public switched telephone network (not shown). Interconnection with the PLMN 100 enables the same mobile terminal 20 to be used in both the PLMN 100 and PWTS 200. Thus, the user is able to roam seamlessly through the PLMN 100 and PWTS 200. Transfer between the PLMN 100 and PWTS 200 in this case are transparent to the user.

Base stations 210 within PWTS 200 are functionally similar to base stations 110 within PLMN 100, but also differ in several respects. Base stations 210 are typically of lower power than those used in the PLMN 100 to avoid interference with the PLMN 100 and, consequently, are deployed closer together to provide coverage over the entire facility 205. An example of a base station 210 designed for use in a PWTS 200 is the PicoBase™ system produced by Ericsson, Inc. Base station 210 may use the same interface as the PLMN 100, or may employ an alternate interface. One alternate interface is a Bluetooth interface that operates in the 2.45 GHz frequency band.

Facility 205 may comprise any geographic locus, such as a shopping mall, sports arena, office building or park, hotel, apartment complex, airport, university campus, etc. Tenants of facility 205 may wish to provide a private radiocommunication system for use by mobile terminal users therein for a broad variety of reasons, including cost control and increased availability of personnel as users migrate from dependence on desktop telephones to mobile terminals. PWTS 200 is typically operated by a business, such as the tenant of facility 205 or the service may be provided by a third party and leased to such business on a flat rate. In either case, users typically do not incur air-time charges for use of radiocommunication services in PWTS 200. Thus, users approaching and entering facility 205 will generally desire to acquire service with the PWTS 200 whenever possible, to avoid air-time charges incurred when using the PLMN 100.

When a mobile terminal 20 powers on, it will attempt to locate a control channel in either the PLMN 100 or the PWTS 200, from which it can, for example, obtain overhead information regarding system operations, receive paging messages and initiate calls. Various techniques are available for locating control channels in public land mobile networks, which techniques are typically specified by the applicable radiocommunication standards. For example, techniques for finding a control channel once the mobile terminal 20 is ordered to search for a control channel, such as by first ranking all the channels in signal strength, are described in TIA/EIA standard ANSI-136 and ETSI's GSM standard, which are incorporated herein by reference. An additional example of techniques by which control channels can be located is found in U.S. Pat. No. 5,570,467 to Sawyer, entitled "Method and Apparatus for Locating a Digital Control Channel in a Radiocommunication System", and U.S. Pat. No. 6,058,108 entitled "Method and apparatus for locating a digital control channel in a radiocommunication system," the disclosures of which are incorporated herein in its entirety.

The location of known private systems to which the user has access can be stored in the mobile terminal 20. For example, a central point in the PWTS 200 or other private system may be stored in the mobile terminal 20 as the reference position and the distance threshold may be a radius R which defines an area encompassing the facility 205. When the position estimator 50 indicates that the mobile terminal 20 is close to a known private system (i.e., the distance from the current position of the mobile terminal 20 and the stored location is less than a predetermined threshold distance), the mobile terminal 20 may trigger a search for a control channel associated with the PWTS 200 and acquires service with the PWTS 200 if a control channel is found. The control channel may be a physical channel or a logical channel. If the search is successful, i.e., a control channel is found, the mobile terminal 20 can acquire service with the PWTS 200. If the mobile terminal 20 fails to locate a suitable control channel, it may be programmed to periodically search for a control channel as long as its estimated current position is within the threshold distance from the reference position, on the assumption that the mobile terminal 20 is merely temporarily shielded from the private system's base station 210. Alternatively, the mobile terminal 20 could be programmed to search for a control channel a predetermined number of times, and then stop searching, on the assumption that the PWTS 200 is inoperative, and further searches would merely waste battery power. In either event, this geographic position approach to initiating the search for the control channel of the PWTS 200 allows a total decoupling of the public and private systems, while simultaneously minimizing the time when the mobile terminal 20 is blind to incoming pages and the current drain associated with geographically indiscriminate periodic control channel searches.

The operation of position estimator 50 increases the current drain on the battery of the mobile terminal 20. Hence, it may not be desired to operate the position estimator 50 on a continuous basis. Other position related applications (e.g., emergency calling) may only activate the position estimator 50 upon request, by a user command or indirectly by the user when enabling an application that utilizes the position of the mobile terminal 20. Thus, if other uses of the position estimator 50 only require infrequent position updates, the current drain of the position estimator 50 to support the locating of private systems, while providing timely discovery of the private systems, may jeopardize the objective of low impact on the current drain of mobile terminal 20.

According to the present invention, the position update frequency may be set by default to a relatively low value and increased as the distance to a point of interest, e.g., the PWTS 200, decreases. Thus, when the position estimator 50 indicates that the mobile terminal 20 is close to a previously learned PWTS 200, the mobile terminal 20 may request the position estimator 50 to update its position with an increased position update frequency in order to avoid any delay in acquiring service with the PWTS 200, while minimizing the current drain of the position estimator 50 when the mobile terminal 20 is far from any private systems. Thus, the frequency of position update becomes a function of the distance to the PWTS 200.

Figure 4:
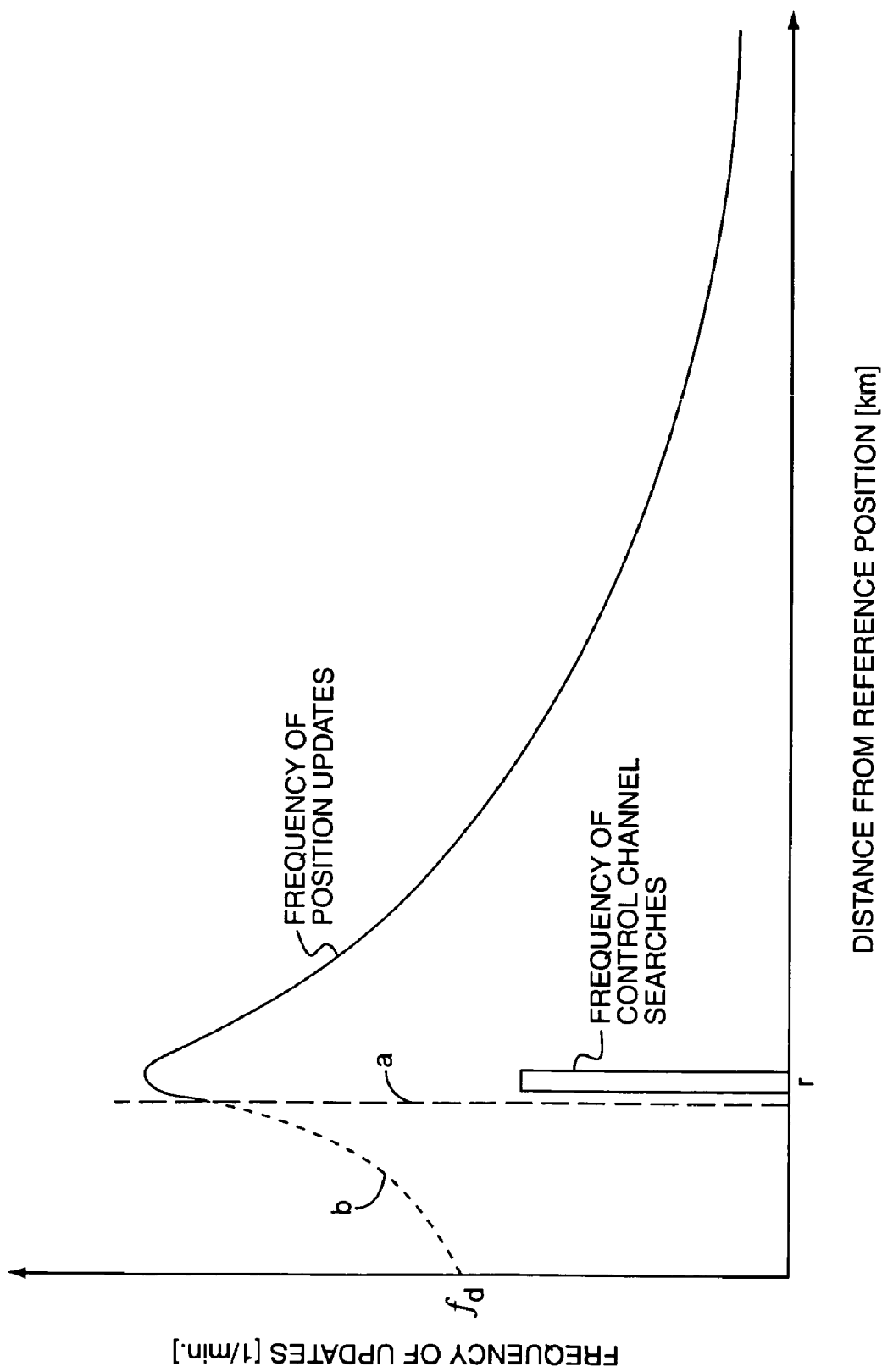
FIG. 4 is an exemplary graph illustrating the relationship between the position update frequency and channel search frequency of the mobile terminal, and the distance between the mobile terminal and a private radiocommunication system.

This function is depicted graphically in FIG. 4, wherein the abscissa represents increasing distance between the mobile terminal 20 and the reference position (in km), and wherein the ordinate represents increasing frequency of position updates by the mobile terminal 20 (in min$^{-1}$). The function, as represented by the first solid curve, is generally decreasing, i.e., of negative instantaneous slope, but may be of any formulation, such as linear, quadratic, inverse exponential, etc., as most effective, and as may be discovered by one of ordinary skill in the art without undue experimentation. The curve reaches a maximum as the user approaches the boundary of the private system, for example at the radius r of a system wherein the stored reference position represents the center of a circular area of coverage. As the user approaches r, mobile terminal 20 updates its position estimate more and more frequently, providing increasingly current estimates of the user's distance from the reference position. This minimizes the delay in triggering a control channel search as the user reaches r (the threshold distance, generally denoting the boundary of the private system).

The dotted curves of FIG. 4 represents two possible responses of the update frequency function as the user enters the range of the private radiocommunication system and searches for a control channel. At this point, the mobile terminal 20 may cease updating its position to conserve battery power—assuming that no other function of the mobile terminal 20 is position-dependant. This response is depicted by dotted graph a. Alternatively, the mobile terminal 20 may default to some intermediate frequency of position update $f_d$, as depicted by dotted graph b. This would allow the mobile terminal 20 to take advantage of position-dependant resources within the area covered by the PWTS 200. These two responses are illustrative only, and a wide variety of other position estimate update schemes are possible, as desired or required by particular applications.

The second solid curve of FIG. 4 represents the control channel search frequency as a function of the distance between the mobile terminal 20 and the reference position. The curve exhibits a step function at the boundary of the PWTS 200. Far from the reference position, no search for a control channel is performed, to preserve battery power. As the mobile terminal 20 moves closer to the boundary of the PWTS 200, the frequency of position updates increases as described above, but still no search for a control channel is initiated, since the mobile terminal 20 is greater than the threshold distance from the reference position, and is thus presumed to be outside of the coverage area of the PWTS 200. When the mobile terminal 20 reaches the boundary of the coverage area at r, a search for a control channel is initiated, as indicated by the step function depicted in the graph. This search is continued, either continuously or periodically, until a control channel for the PWTS 200 is found or until a predetermined number of access attempts have been made. If the search is successful, the mobile terminal 20 switches communications to the PWTS 200 and ceases its search for a control channel.

As a further refinement of this approach, the frequency of position updates may be dependant on the rate of change of distance of mobile terminal 20 from the point of interest. Consider the example of a user within a PWTS 200 having lunch in a place just outside the coverage of the PWTS 200, but very geographically close to the PWTS 200. In this case, as described above, the mobile terminal 20 would update its position frequently since its current position is close to the known reference position of the PWTS 200. This frequent position estimate update would be to minimize the time necessary to acquire service with the PWTS 200 when the user moves within the coverage area of the PWTS 200. In this example, however, the user does not gain any advantage from the frequent position estimate updates, since the user is not moving towards the PWTS 200. In fact, the frequent position estimate updates are counterproductive, as they cause the position estimator 50 to needlessly consume battery power. By reducing the frequency of position estimate updates when the rate of change of calculated distance from the PWTS 200 is low (even when the absolute distance to the PWTS 200 is small), battery power is conserved without a loss of timeliness of detection of the PWTS 200. Following lunch, the user moves back towards the PWTS 200 boundary. The higher rate of change of his distance from the PWTS 200 triggers more frequent position estimate updates. Thus the mobile terminal 20 will trigger its search for the PWTS 200's control channel very soon after reaching the threshold distance. If the user is relatively far from the coverage area of the PWTS 200, the mobile terminal 20 would update its position less frequently due to the increased distance, and the rate of change of that distance would have no impact.

Typically, the user will prefer to use a PWTS 200 over a public one, to minimize usage charges, i.e., air-time charges. Thus the mobile terminal 20 may be designed to maintain service with the PWTS 200 as long as the communication quality is sufficient. Hence, the service selection algorithm in the mobile terminal 20 may not use position estimates from the position estimator 50 to determine when to switch to the less preferred system, for example, a PLMN 100. In this case, the marginal communication quality of the downlink control channel when in idle mode may be used as a trigger event for searching for the PLMN 100. However, in order to avoid "channel dragging," in which the mobile terminal 20 is using, or will be using if a call is placed or received, a channel assigned to the PWTS 200 while far into the PLMN 100 and thereby potentially creating interference, a combination of channel quality and estimated position may be used to determine when to switch to the less preferred system. Alternatively, the threshold distance and rate of change in distance between the mobile terminal 20 and the reference position may be utilized to switch from a private to a PLMN 100 as disclosed herein to switch from a PLMN 100 to a PWTS 200.

The learning of the location of a PWTS 200 by the mobile terminal 20 can take various forms. Once the mobile terminal 20 is camped on the PWTS 200, the PWTS 200 can download a geographic description of its coverage area. Alternatively, the user may download the information provided on, e.g., a corporate WEB site, over a wireless link. In this case, the wireless communication system is used to download the information but is not aware of the content nor initiates the transaction. However loaded, the mobile terminal 20 may discard the information about private systems if they are not visited for an extended period of time and there is a memory shortage. The user may be prompted about this proposed action.

The format of the location information may take various forms. In its simplest representation, the location is a single position. A more useful representation would be a single position and a radius, defining a circular area. An oddshaped system may be described by multiple positions defining a boundary, forming a polygon when connected by straight lines. A wide variety of other modes of identifying boundaries of a coverage area may be utilized, as known in the art, and as may be determined by one of ordinary skill without undue experimentation.

The above formats may advantageously be augmented by a height factor, e.g., over sea level or similar reference point. This may add precision, e.g., for a business located in a multi-story building. Thus, the distance from the mobile terminal 20 to the reference location may be computed in three-dimensional space. In all the above formats, it is envisioned that the location information concerning the PWTS 200 will be contained within the operative boundaries of the PWTS 200. As used herein, the term "within the boundaries of" includes within the system or along the boundaries of the system.

The present invention has been explicated herein in reference to an environment comprising a public and a private radiocommunication system, with the PWTS 200 being generally preferred by the user. The invention is not thus limited, however, and may be advantageously employed to switch from any first wireless system to any second wireless system about which geographic extent is known. Thus, as used herein, the term "PWTS 200" refers to its desirability vis a vis the public cellular system, and not to details of ownership and access. For example, a public wireless system operated at, e.g., a sports arena, wherein air-time rates are lower than the surrounding cellular system, would qualify as a private or alternate system as described herein.

Thus, while the invention has been described illustratively herein with reference to various specific embodiments, aspects and features, it will be recognized that the invention is not thus limited, but encompasses numerous variations, modifications and other embodiments, and accordingly such other variations, modifications and other embodiments are to be regarded as being within the spirit and scope of the invention as claimed.

What is claimed is:

1. A method of initiating a search for a control channel in a communications network by a mobile terminal, said method comprising:
    storing at least one reference position indicative of a central point of said communications network in said mobile terminal;
    determining the current position of said mobile terminal;
    computing the distance of said current position of said mobile terminal from said reference position; and
    initiating a search for a channel based on said distance between said mobile terminal and said communication network.

2. The method of claim 1, including establishing communication between said and said mobile terminal and said communication network.

3. The method of claim 2 wherein establishing communications between said mobile terminal and said communications network comprises establishing communication with a private radiocommunication system.

4. The method of claim 3 wherein establishing communication with a private radiocommunication system comprises establishing communication with said private radiocommunication system via a short-range air interfere.

5. The method of claim 4 wherein establishing communication with said private radiocommunication system via a short-range air interfere comprises establishing communication with said private radiocommunication system via a Bluetooth interface.

6. The method of claim 1, wherein determining the current position of said mobile terminal comprises receiving signals from navigation satellites and calculating said current position from said signals received from said navigation satellites.

7. The method of claim 1, wherein determining said current position of said mobile terminal is repeated at intervals dependant on said distance of said current position of said mobile terminal from said reference position.

8. The method of claim 1, further comprising determining the rate of change in said position of said mobile terminal relative to said reference position.

9. The method of claim 8, wherein determining said current position of said mobile terminal is repeated at intervals dependant on said rate of change of distance of said mobile terminal from said reference position.

10. A mobile terminal comprising:
    a transceiver transmitting and receiving signals over a wireless channel;
    memory storing at least one reference position indicative of a central point of a communications network;
    a position estimator to determine a current position of said mobile terminal; and
    control logic including a processor to calculate the distance of said mobile terminal from said reference position based on said current position of said mobile terminal and to initiate a search for a channel based on said calculated distance.

11. The mobile terminal of claim 10, wherein said position estimator comprises a receiver adapted to receive signals from navigation satellites and to calculate said current position from said received signals.

12. The mobile terminal of claim 10, wherein said control logic further calculates the rate of change of said current position relative to said reference position.

13. The mobile terminal of claim 12, wherein said control logic updates said current position at a frequency dependant on said rate of change of said current position relative to said reference position.

14. The mobile terminal of claim 10 wherein said mobile terminal further comprises a Bluetooth interface.

15. A method of controlling the initiation of a search by a mobile terminal for a channel associated with a radiocommunication system comprising:
    repeatedly determining the location of the mobile terminal with respect to a central point associated with the radio communication system; and
    initiating a search for a channel associated with said radio communication system if the computed distance between the mobile terminal and the central point is less than a predetermined distance.

16. A method of initiating a search for a control channel in a communications network by a mobile terminal, said method comprising:
    storing a plurality of reference positions defining the boundary of said communications network in said mobile terminal;
    determining the current position of said mobile terminal;
    comparing said current position of said mobile terminal to said boundary; and
    initiating a search for a channel if said mobile terminal position is within said boundary.

17. A mobile terminal comprising:
a transceiver transmitting and receiving signals over a wireless channel;
memory storing a plurality of reference positions defining the boundary of a communications network;
a position estimator to determine a current position of said mobile terminal; and
control logic including a processor to compare the current position of said mobile terminal to said reference positions and to initiate a search for a channel if said current position is within said boundary.

* * * * *